United States Patent
Fu et al.

(10) Patent No.: US 8,316,079 B2
(45) Date of Patent: Nov. 20, 2012

(54) METHOD AND APPARATUS FOR RELIABLE MASHUP

(75) Inventors: Rong Yao Fu, Beijing (CN); Chang Jie Guo, Beijing (CN); Yi Hui, Beijing (CN); Wei Sun, Beijing (CN); Kuo Zhang, Beijing (CN)

(73) Assignee: International Buisness Machines Corporation, Armonk, NY (US)

( * ) Notice: Subject to any disclaimer, the term of this patent is extended or adjusted under 35 U.S.C. 154(b) by 142 days.

(21) Appl. No.: 12/430,252

(22) Filed: Apr. 27, 2009

(65) Prior Publication Data

US 2009/0271474 A1 Oct. 29, 2009

(30) Foreign Application Priority Data

Apr. 28, 2008 (CN) .......................... 2008 1 0091270

(51) Int. Cl.
*G06F 15/16* (2006.01)
(52) U.S. Cl. ........ 709/202; 709/225; 709/229; 709/236; 709/246
(58) Field of Classification Search .................. 709/202, 709/225, 229, 236, 246
See application file for complete search history.

(56) References Cited

U.S. PATENT DOCUMENTS

| | | | |
|---|---|---|---|
| 2001/0034771 A1* | 10/2001 | Hutsch et al. | 709/217 |
| 2003/0212654 A1 | 11/2003 | Harper et al. | |
| 2004/0030788 A1* | 2/2004 | Cimo et al. | 709/229 |
| 2005/0165817 A1 | 7/2005 | O'Conor | |
| 2006/0031763 A1* | 2/2006 | Yeung | 715/523 |
| 2006/0167860 A1* | 7/2006 | Eliashberg et al. | 707/3 |
| 2007/0022119 A1 | 1/2007 | Roy et al. | |
| 2007/0239587 A1 | 10/2007 | Tsigutkin et al. | |
| 2007/0260673 A1* | 11/2007 | Shenfield et al. | 709/203 |
| 2008/0215675 A1* | 9/2008 | Kaminitz et al. | 709/203 |
| 2009/0024915 A1* | 1/2009 | Cudich et al. | 715/234 |
| 2009/0119375 A1* | 5/2009 | Shenfield | 709/206 |

* cited by examiner

*Primary Examiner* — Larry Donaghue
*Assistant Examiner* — Nicholas Taylor
(74) *Attorney, Agent, or Firm* — Gail H. Zarick; Anne Vachon Dougherty

(57) ABSTRACT

A method and apparatus for reliable mashup. The method includes the steps of: intercepting a data update request submitted by a client browser to one or more of a plurality of services for providing mashup page data; performing consistency validation on the data update request using consistency rules; and, in response to a successful validation, forwarding the data update request to the one or more of the plurality of services.

11 Claims, 7 Drawing Sheets

METHOD AND APPARATUS FOR RELIABLE MASHUP

CROSS REFERENCE TO RELATED APPLICATION

This application claims priority under 35 U.S.C. 119 from Chinese Patent Application 200810091270.2, filed Apr. 28, 2008, the entire contents of which are incorporated herein.

BACKGROUND OF THE INVENTION

1. Field of the Invention

The present invention relates to web applications, particularly to mashup technologies, and more particularly to a method and apparatus for reliable mashup.

2. Description of Related Art

With the popularization of Web 2.0, mashup technologies are more and more widely used in Business Composition Scenarios. Mashup technologies leverage the script function of a browser, and construct user interfaces (hereinafter, UIs) and data elements from different pages and combine the elements through integration logics, thus forming a new uniform page. In the prior mashup technologies, there exist several problems as follows.

First, the browser may be unable to provide reliable client data transportation. Second, an exceptional modification may be made to data at client side by a user or a script.

For example, FIG. 1 shows an exemplary use of mashup using a Customer Relationship Management (hereinafter, CRM) service and an Enterprise Resource Planning (hereinafter, ERP) service, where Opportunities in CRM are loaded in a browser, and are stored as an Order in ERP. The use comprises the following steps.

1. Load customer information and order details (product name, unit price and quantity) from a CRM application to a CRM widget.

2. Load product specification and inventory information from ERP to an ERP widget.

3. When a salesperson wishes to create a new order, he can convert the data (user ID, product name and quantity) managed in the CRM widget and transfer them to an ERP "order creation" widget.

4. Send the order information to the ERP application through AJAX.

5. Send an order confirm response to the CRM application.

In step 3 of the above sequence, the data could be modified at a client side inadvertently or maliciously, and a script such as Javascript may throw an exception or be executed erroneously. In steps 4 and 5, the browser could be closed or crash. All those can cause inconsistency between the data in ERP and the data in CRM.

In order to solve the problem, enhanced client side validation and control logics are implemented in a prior art solution. However, such a solution is still ineffective for the cases of browser crashes and a user's malicious actions.

Another prior art solution, such as all in Extract, Transform, Load (hereinafter, ETL) and Enterprise Application Integration (hereinafter, EAI) solutions, uses server side integration, that is, accessing and integrating different web applications at the server side. Such a solution can provide reliable services as well as data consistency control. However such a solution no longer belongs to a mashup technology, and the disadvantage is that it needs a significant Information Technology (hereinafter, IT) development and a relatively long development lifecycle.

A reliable mashup solution is needed in the art, which can solve the data inconsistency problem in the existing mashup technologies, and at the same time allow a user to have a lightweight and agile mashup development experience.

SUMMARY OF THE INVENTION

According to an aspect of the present invention, there is provided a method for reliable mashup, comprising the steps of: intercepting a data update request submitted by a client browser to one or more of a plurality of services for providing mashup page data; performing consistency validation on the data update request by using consistency rules; and, in response to a successful validation, forwarding the data update request to the one or more of the plurality of services.

According to another aspect of the present invention, a storage medium is provided that embodies a computer program that will cause a computer to perform the steps of the above method.

According to still another aspect, there is provided an apparatus for reliable mashup, comprising: an intercepting module configured to intercept a data update request submitted by a client browser to one or more of a plurality of services for providing mashup page data; a consistency validator configured to perform consistency validation on the data update request by using consistency rules; and a forwarding module configured to forward the data update request to the one or more of the plurality of services, in response to a successful validation.

BRIEF DESCRIPTION OF THE DRAWINGS

The invention and its preferred embodiments and advantages can be best understood from the following detailed description of the illustrative embodiments when read in conjunction with the drawings, in which.

DETAILED DESCRIPTION OF THE PREFERRED EMBODIMENTS

The present invention overcomes the problem of data inconsistency in the prior art mashup technologies, and provides a reliable and consistent mashup technology, and at the same time the implementation of the reliable and consistent mashup technology allows a user to keep a lightweight and agile development experience.

Figure 1:
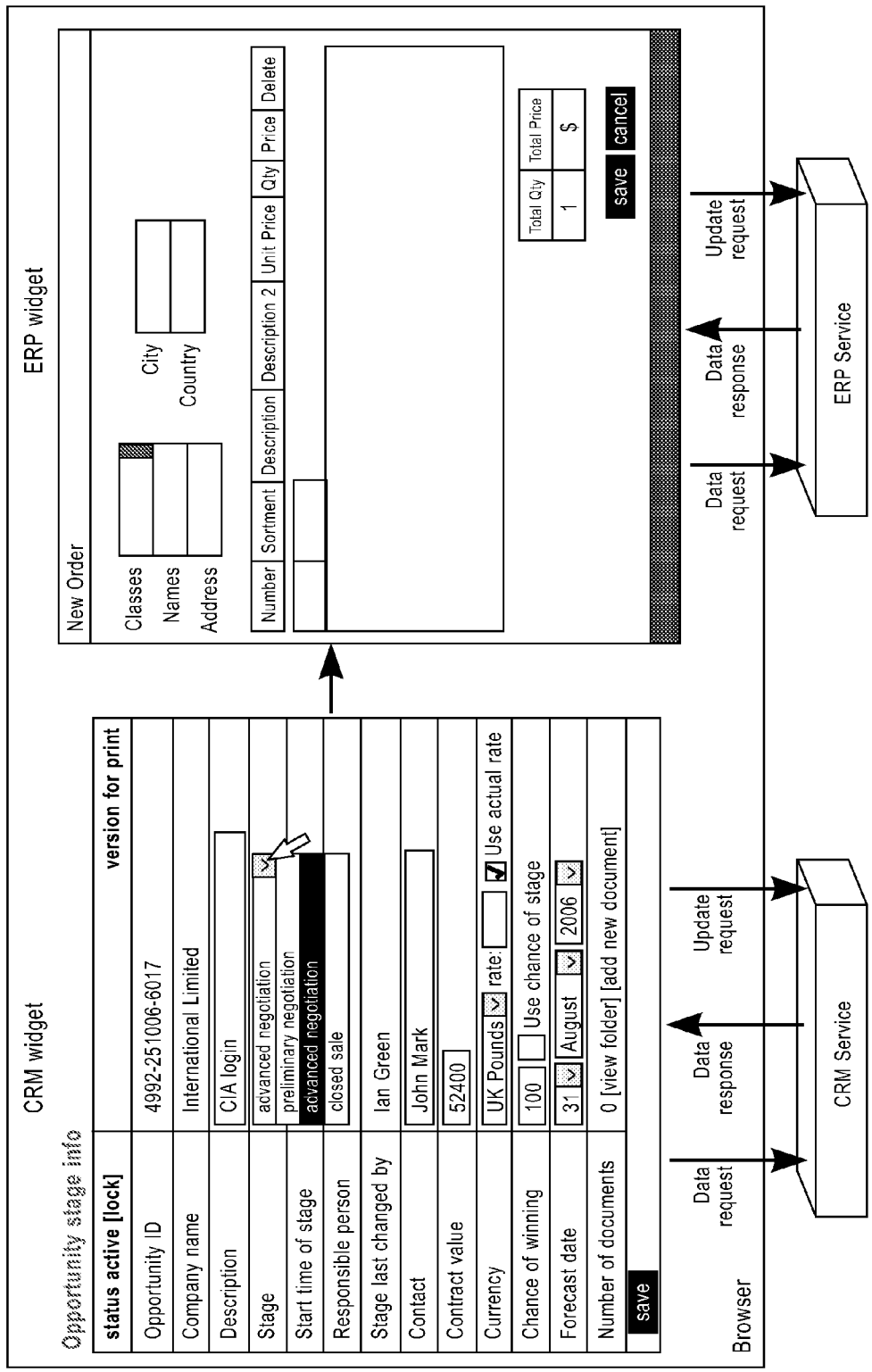
FIG. 1 shows an exemplary use scenario of mashup using a CRM service and an ERP service in the prior art.
Figure 2:
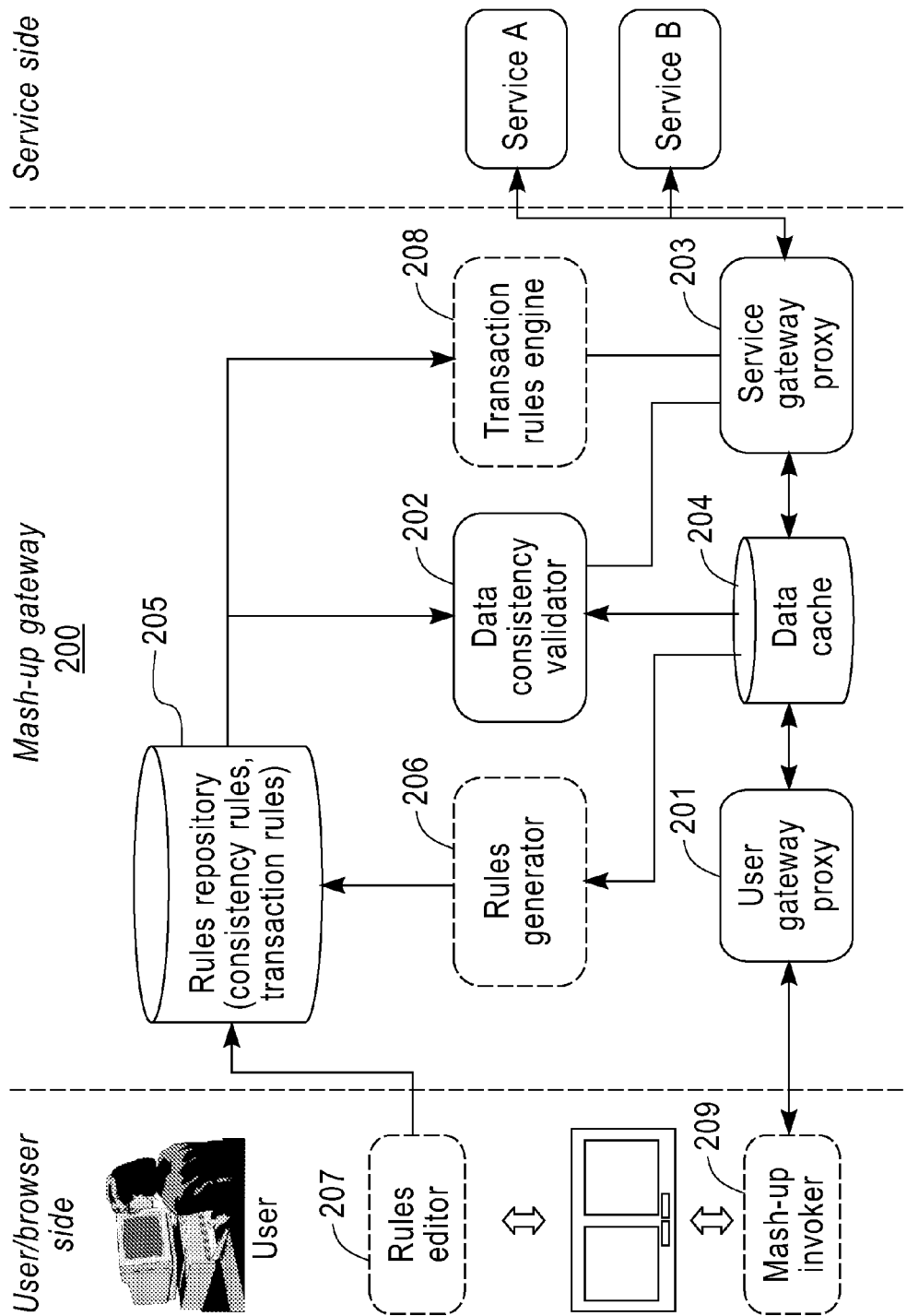
FIG. 2 shows an apparatus for reliable mashup according to an embodiment of the present invention and the operation environment thereof.

Referring to FIG. 2, apparatus for reliable mashup according to an embodiment of the present invention, and the operation environment thereof, is shown. The apparatus is implemented by a server side gateway such as a mashup gateway 200 arranged between a client browser for displaying a mashup page and a plurality of services for providing mashup page data. The mashup gateway is configured to intercept and forward communications between a client browser and a server, and performs consistency validation on data update requests sent by the client browser to services.

The apparatus for reliable mashup comprises a user gateway proxy 201, a consistency validator 202 and a service gateway proxy 203. The user gateway proxy 201 is configured to, in response to the client browser submitting a data update request to one or more services in a plurality of services according to an operation of the user in the mashup page, intercept the data update request. The consistency validator 202 is configured to perform consistency validation on the data update request by using consistency rules. The service gateway proxy 203 is configured to, in response to success of the validation, forward the data update request to the one or more services in the plurality of services.

The user gateway proxy 201 is further configured to receive any other request such as a data request from the client browser in addition to data update requests, and is configured to forward the response from one or more of the plurality of services to the client browser. The response can be either page data sent by the one or more of the plurality of services to the client browser in response to the request form the client browser, or mashup page data generated by the mashup gateway based on the page data from the one or more services.

The service gateway proxy 203 is further configured to receive a response from one or more of the plurality of services, such as the page data sent to the client browser based on a request therefrom.

The apparatus for reliable mashup further comprises a data cache 204 for caching requests from the client browser as intercepted by the user gateway proxy 201 and responses from one or more of the services as received by the service gateway proxy 202.

When the user gateway proxy 201 has intercepted a data update request from the client browser, the consistency validator 202 can check whether the data update request complies with consistency rules. When the data update request complies with the consistency rules, the service gateway proxy 203 is informed to forward the data update request to corresponding services; and when the data update request does not comply with the consistency rules, the service gateway proxy 203 is informed not to send the data update request to corresponding services, and optionally send an error message to the user at the client or an administrator.

The apparatus for reliable mashup further comprises a rules repository 205 configured to store consistency rules, which define the consistency between a plurality of services. Thus the consistency validator 202 can validate a data update request from the client browser based on the consistency rules in the rules repository 205.

The consistency validator 202 performs the validation by utilizing the response data from the plurality of services to a data request from the client browser, cached in the data cache 204. For example, when the service gateway proxy 203 receives the page data sent by the plurality of services in response to a data request from the client browser, it caches the page data from the plurality of services such as a DOM tree (nodes and values thereof) in the data cache 204, and the user gateway proxy 201 sends the page data or mashup page data generated from the page data to the client browser, so as to present the mashup page in the client browser. Thereafter, when the user performs data update operations in a plurality of widgets corresponding to the plurality of services, respectively, in the mashup page, the data update request sent to the plurality of services will be sent into the mashup gateway 200. The consistency validator 202 in the mashup gateway 200 will validate the consistency among the data of the plurality of services involved in the data update request by using the consistency rule and utilizing the page data stored in the data cache 204.

The mashup gateway further comprises a rule generator 206 for generating the consistency rules by analyzing the mashup page data, and for deploying the consistency rules into the mashup gateway. The rule generator 206 can be located either in the mashup gateway 200 or outside the mashup gateway, such as at the client side.

The consistency rules comprises the dependency or reference relationships among the data items transferred between the client browser and the plurality of services and/or operation logics on the data items.

The rule generator 206 is further configured to analyze the Document Object Model (hereinafter, DOM) tree of the mashup page, and obtain the dependency or reference relationships among the data items of the relevant nodes in the DOM tree and/or the corresponding operation logics, as the consistency rules, by analyzing the mashup logics in the mashup page data.

Figure 3:
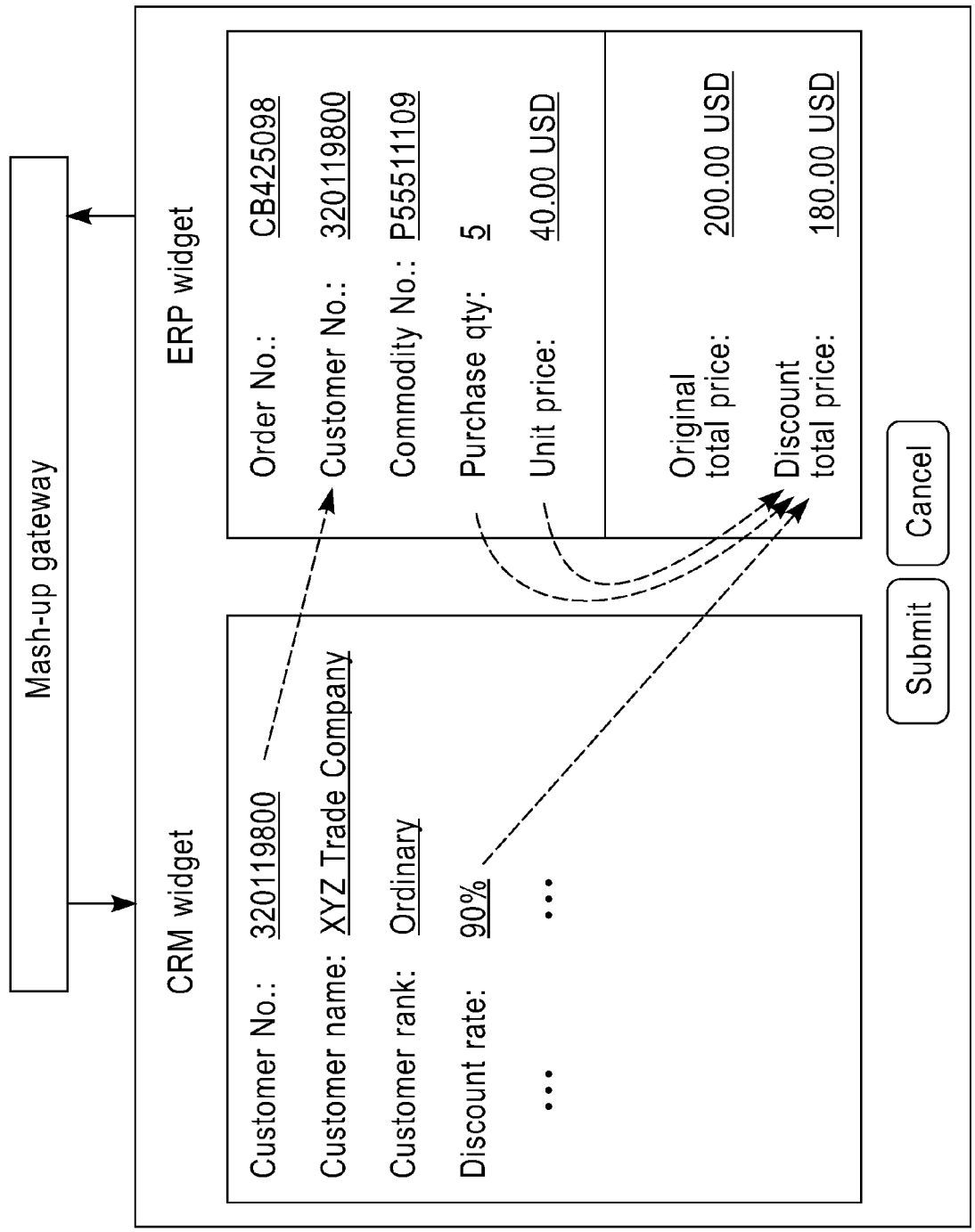
FIG. 3 schematically shows the UI of an exemplary mashup page.

For example, FIG. 3 shows the UI of an exemplary mashup page. As shown in the figure, the mashup page consists of a CRM widget from a CRM service and an ERP widget from an ERP service. There are such fields as customer number, customer name, customer rank and discount rate applicable to the customer, etc., in the CRM widget; and there are such fields as order number, customer number, commodity number, purchase quantity, unit price, original total price and discount total price, etc., in the ERP widget, where the value of the customer number field is imported automatically from the CRM widget, the value of the purchase quantity field is input by the user, and the values of the original total price and discount total price fields are computed by using the values of other fields in the CRM widget and the ERP widget. So the following consistency rules can be generated and stored in the mashup gateway 200 with respect to the exemplary mashup page:

Consistency rule 1: the customer number in the ERP widget must come from the customer number in the CRM widget;

Consistency rule 2: discount total price=purchase number*unit price*discount rate.

The consistency rules can be obtained by analyzing the DOM tree and nodes thereof in the mashup page and by analyzing the dependency or reference relationships among tree nodes and/or corresponding operation logics represented by Javascript code, for example, in the mashup page.

In addition to the consistency rules, the data cache 204 further caches the DOM tree of the CRM widget and ERP widget. The DOM tree was cached originally when the mashup gateway 200 intercepted the page data sent by the CRM service and the ERP service in response to the data request from the client browser.

Figure 4:
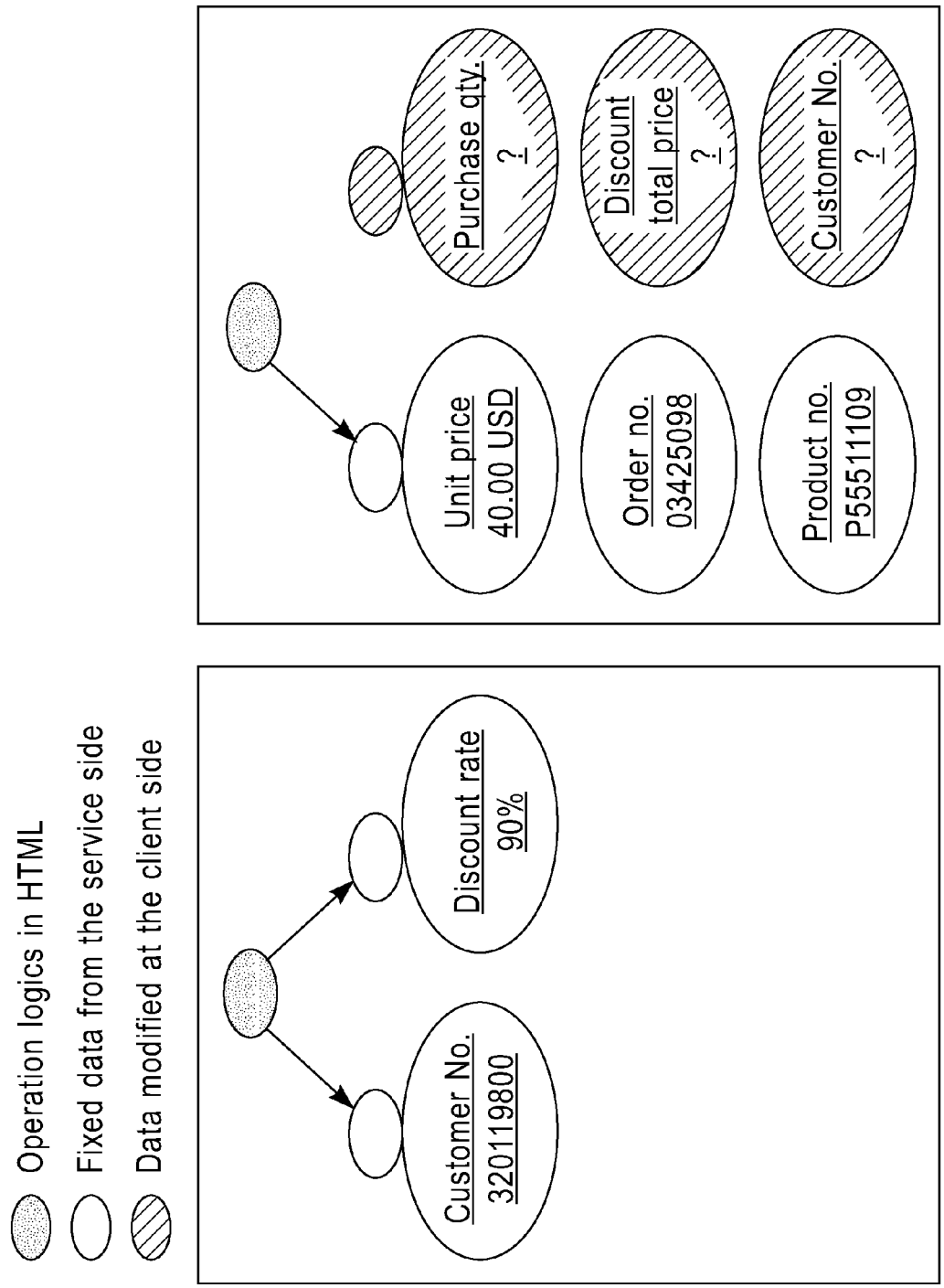
FIG. 4 schematically shows an example of a DOM tree cached in a mashup gateway.

FIG. 4 shows an example of the DOM tree cached in the data cache 204. Thus, if a client maliciously tampers with the data by using a hacker method, such as lowering the discount total price, the consistency validator 202 will detect it based on the above consistency rule 2 and the discount rate (90%), purchase quantity and unit price cached in advance, that is, the consistency validator 202 will find the discount price submitted by the client is inconsistent with the discount total price calculated based on the consistency rule 2 . In addition, if the client has modified the customer number in the ERP order, it will also be detected by the consistency validator 202.

In summary, no matter whether the inconsistency between the data for the CRM service and the data for the ERP service is caused by the client intentionally or inadvertently or by software and hardware device failure of the client, it will be detected by the consistency validator 202 based on the corresponding consistency rule, and the consistency validator 202 can return an error message to the client user or the administrator, thus avoiding sending the inconsistent data to the CRM service or ERP service.

The apparatus for reliable mashup further comprises a rules editor 207 for creating consistency rules by a user, or for editing consistency rules already generated, thus forming the said consistency rules. The user can edit the consistency rules generated by the rule generator 206 in the rules editor 207, or create new consistency rules, and deploy the edited or created consistency rules in the rules repository 205.

The apparatus for reliable mashup further comprises a tagging module (not shown) for tagging mashup segments in a mashup page by a user so that the rule generator 206 can perform the analysis. As an example, the user can manually tag the mashup segments in the mashup page by using a tagging module, which can be located either in the client or in the mashup gateway 200.

The rules repository 205 is further used for storing transaction rules. The apparatus for reliable mashup further comprises a transaction rules engine 208 configured to apply transaction rules, thus implementing transaction processing between the client browser and the plurality of services. For example, when the apparatus for reliable mashup receives a plurality of data update requests to a plurality of services from the client browser, the transaction rules engine 208 regards the plurality of data update requests as a same transaction so as to ensure each of the plurality of data update requests be submitted to a corresponding service and executed successively, and when any data update request is not submitted or executed successively, the other data update requests will be abandoned or rollbacked, thus avoiding the data inconsistency among the services due to the failure of a certain service.

Figure 5:
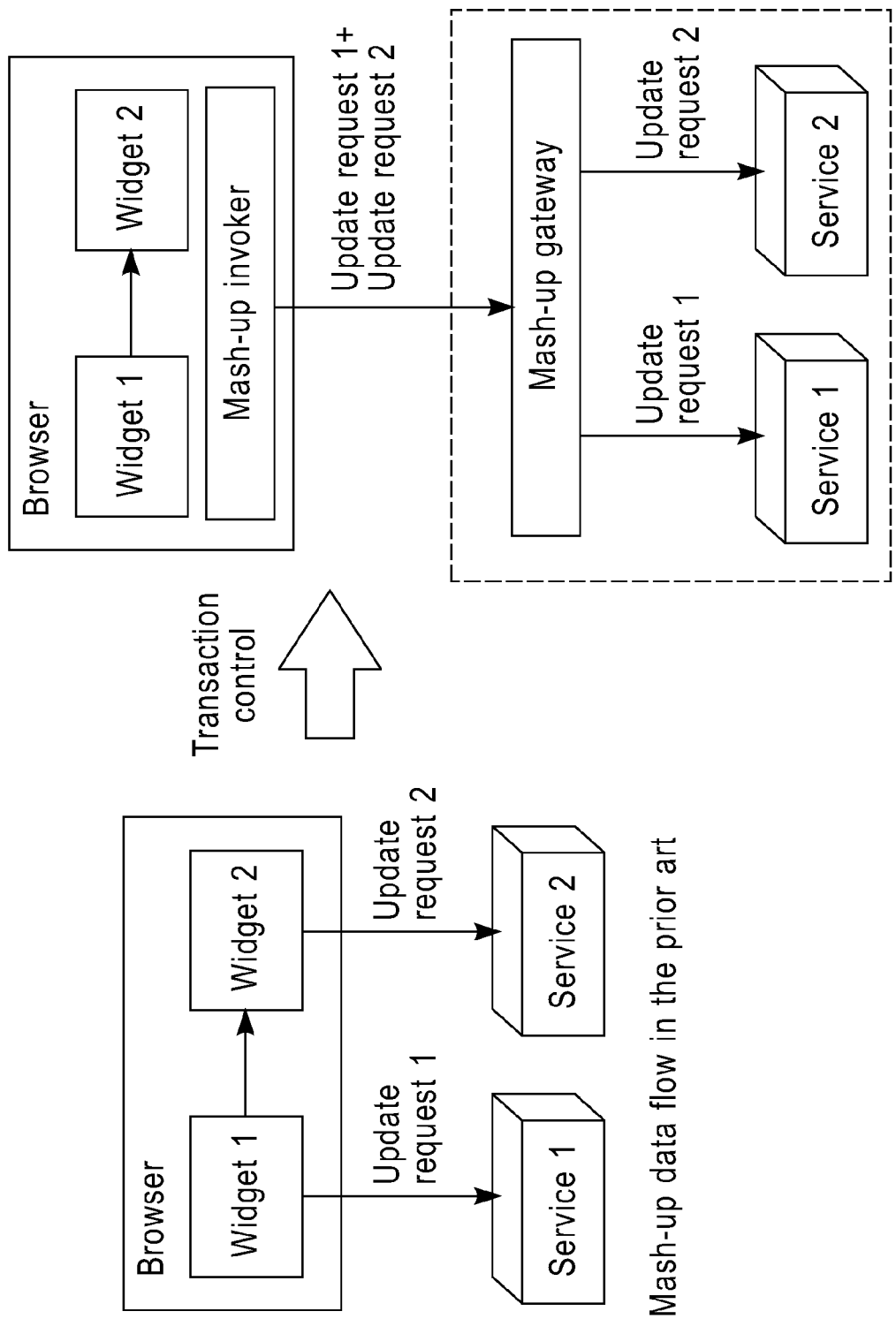
FIG. 5 shows a comparison between the data flow of the apparatus for reliable mashup according to the embodiment of the present invention implementing transaction rules and the data flow of the mashup technologies of the prior art.

FIG. 5 shows a comparison between the data flow of the apparatus for reliable mashup according to an embodiment of the present invention implementing transaction rules and the data flow of the mashup technologies of the prior art. As shown in the figure, in the mashup technologies of the prior art, when widget 1 and widget 2 in a browser submit data update requests to service 1 and service 2 respectively, the two data update requests are provided independent of each other, while in the apparatus for reliable mashup according to an embodiment of the present invention, the data update requests submitted by widget 1 and widget 2 in the browser to service 1 and service 2 respectively are intercepted by a mashup gateway, which then forwards the respective data update requests to service 1 and service 2. Thus the mashup gateway can implement transaction rules on the two data update requests, regarding the two data update requests as a transaction. That is, only when the two data update requests are executed successively within a timeout, will the two data update requests be accepted; and when any data update request is not executed successively within the timeout, then the two data update requests are cancelled and an error message is returned, and if the other data update request has already been executed, then a rollback operation is executed, canceling the execution results of the other data update request.

Table 1 shows an example of simple transaction rules which can be applied by the transaction rules engine 208.

TABLE 1

Transaction Rules

| Update request 1 | Update request 2 | Action |
| --- | --- | --- |
| Success | Success | Successively return |
| Failure | * | The data update request 1 is retransmitted until success. If no success is achieved within certain threshold times, then a failure message is returned. |
| Success | Failure | The data update request 2 is retransmitted until success. If no success is achieved within certain threshold times, then rollback and return a failure message. |

The above transaction rules can be defined by a user and deployed in the rules repository 205.

The apparatus for reliable mashup further comprises a mashup invoker 209 disposed in the client, such as the client browser, which is configured to intercept a request sent by the client browser to a plurality of services, and forward the request to the user gateway proxy 201. In another embodiment of the present invention, the mashup invoker 209 can be dispensed with, and the browser directly forwards to the intercepting module 209 the request to the plurality of services.

While the foregoing describes the apparatus for reliable mashup according to an embodiment of the present invention, it should be pointed out that the above description is only an illustrative description of the present invention, and not a limitation to the present invention. In other embodiments of the present invention, the apparatus for reliable mashup can have more, less or different modules and there may be different containment or connection relationships among the modules. For example, in some embodiments of the present invention, the apparatus for reliable mashup may not include one or more of the data cache 204, the rules repository 205, the rule generator 206, the rules editor 207, the transaction rules engine 208, the mashup invoker 209 and the tagging module; the rules repository 205 and the data cache 204 can be a same storage module; the user gateway proxy 201 and the service gateway proxy 203 can be a same intercepting and forwarding module for intercepting and forwarding communications between the client browser and the plurality of services; and the apparatus for reliable mashup may further comprise a mashup page constructor for constructing mashup pages based on page data from a plurality of services, and so on. All of these variations fall within the spirit and scope of the present invention.

In addition, in the above description, the specific name of each functional module is only used for the convenience of narration, instead of a limitation to the present invention. For example, the user gateway proxy can also be referred to as an intercepting module, the service gateway proxy can also be referred to as a forwarding module, the mashup gateway can also be referred to as a mashup proxy or a server side proxy, and so on.

Figure 6:
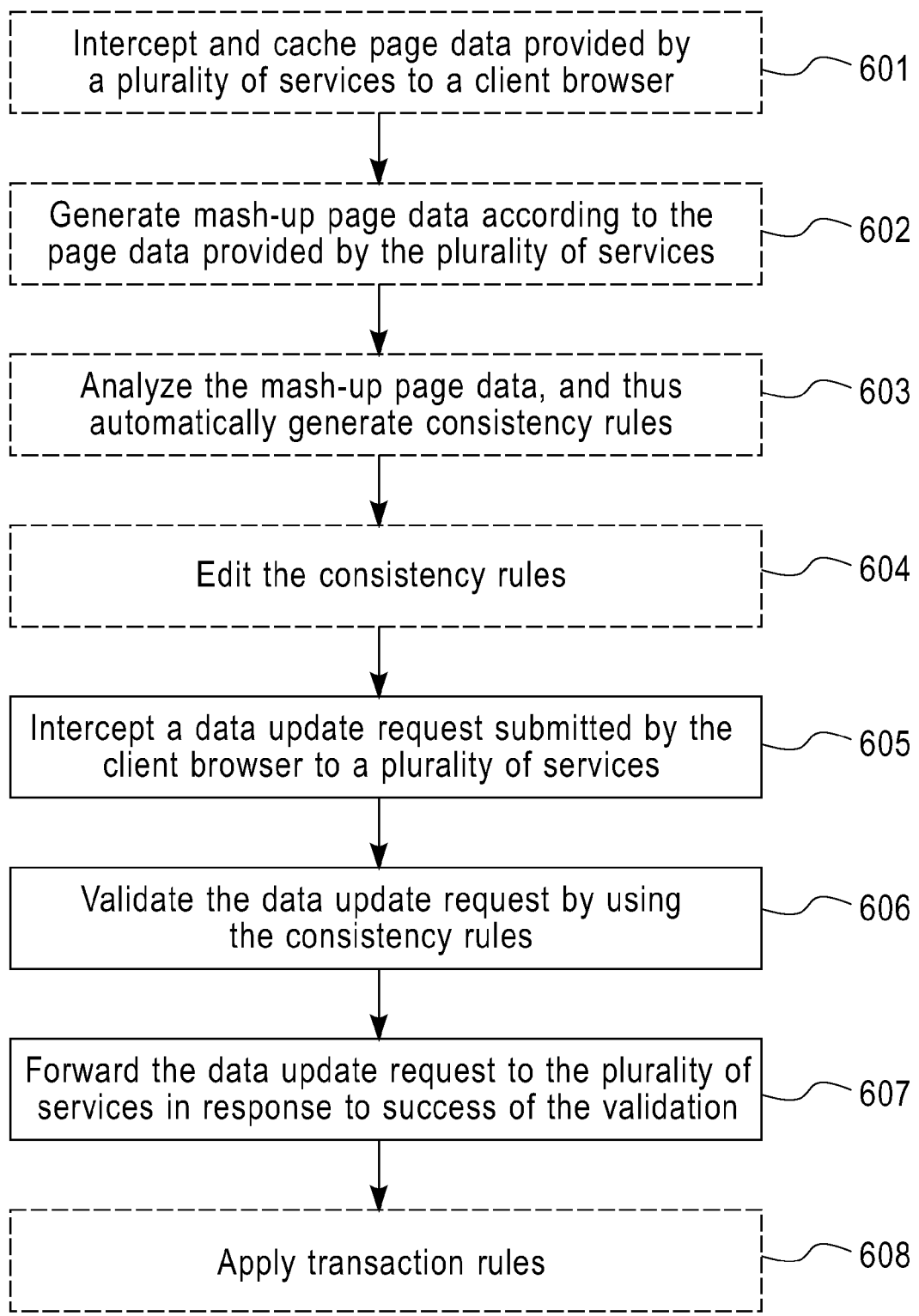
FIG. 6 shows a method for reliable mashup according to an embodiment of the present invention.

Referring to FIG. 6, a method for reliable mashup according to an embodiment of the present invention will be described. The method can be executed by the above apparatus for reliable mashup, so the steps of the method correspond to the operations of the above apparatus and function modules thereof. Of course the method can also be executed by other apparatuses. For the sake of brevity, the steps of the method will only be described briefly below, and the above description of the apparatus can be referred to for a detailed description.

The method for reliable mashup according to this embodiment of the present invention comprises the following steps:

In optional step 601, the page data sent by a plurality of services to a client browser are intercepted and cached. The page data can be provided by the plurality of services in response to a data request from the client browser. The step of intercepting and caching can be executed by a device disposed between the client browser and the plurality of services, such as a mashup gateway.

In optional step 602, mashup page data are generated according to the page data provided by the plurality of services and are presented in the client browser. The generating step can be executed either in the mashup gateway, or in the client side.

In optional step 603, the mashup page data are analyzed, thus generating consistency rules automatically. The step can be executed either in the mashup gateway, or in the client side. The generated consistency rules can be deployed in the mashup gateway.

An optional step of tagging mashup segments in the mashup page so as to perform the analysis is further provided.

The consistency rules include the dependency or reference relationships among data items transferred between the client browser and the plurality of services and/or the operation logics on the data items.

The step 603 comprises analyzing the DOM tree of the mashup page, and obtaining the dependency or reference relationships among data items of relevant nodes in the DOM tree and/or the corresponding operation logics, as the consistency rules, by analyzing the mashup logics in the mashup page data.

In optional step 604, the user edits the automatically generated consistency rules or creates consistency rules from scratch. The step can be executed either in the mashup gateway, or in the client side.

In step 605, in response to the client browser submitting a data update request to one of more of the plurality of services from the mashup page, the data update request is intercepted.

In step 606, a consistency validation is performed on the data update request by using the consistency rules. The step comprises performing the consistency validation utilizing the data cached in step 601.

In step 607, in response the success of the validation, the data update request is forwarded to one or more of the plurality of services.

In optional step 608, transaction rules are applied so as to implement transaction processing between the client browser and the plurality of services.

The steps 605-608 can be implemented by a device disposed between the client browser and the plurality of services, such as a mashup gateway.

The method is implemented by a server side gateway disposed between the client browser and the plurality of services, such as the mashup gateway 200.

It should be pointed out that the above description is only an illustrative description of the present invention, instead of a limitation to the present invention. In some embodiments of the present invention, one or more of the above mentioned optional steps can be dispensed with. In addition, while for the convenience of illustration and description, the above steps are illustrated and described in a certain order, this does not imply that the steps must follow the illustrated and described order. All of these variations are within the spirit and scope of the present invention.

Figure 7:
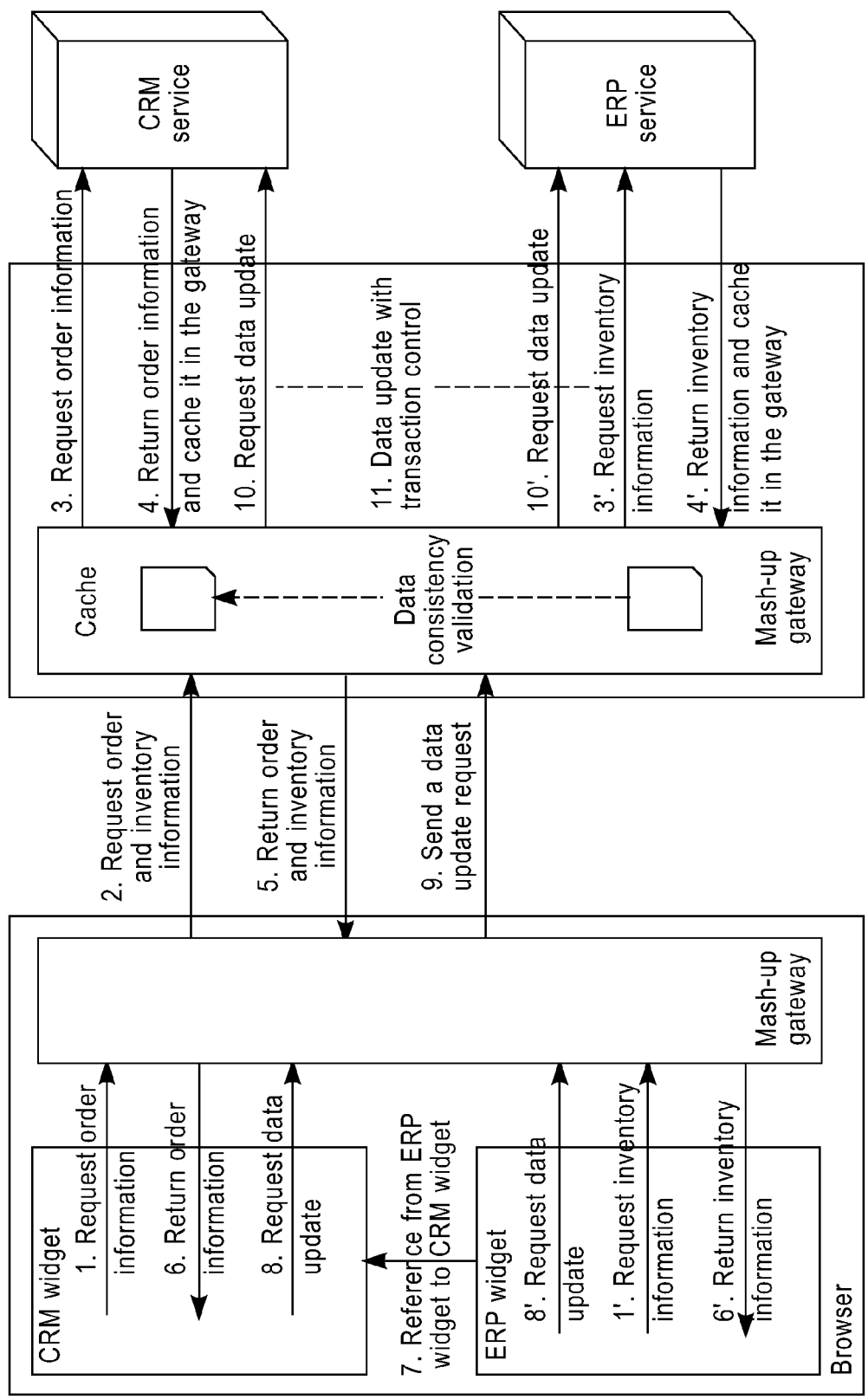
FIG. 7 shows an exemplary operational process of the apparatus for reliable mashup according to an embodiment of the present invention.

Referring to FIG. 7, an exemplary operation process of the apparatus for reliable mashup according to this embodiment of the present invention will be described. As shown in FIG. 7, the example involves a CRM service and an ERP service as well as a mashup page containing a CRM widget and an ERP widget. In step 1, the CRM widget sends to the CRM service a request "request order information". In step 1', the ERP widget sends to the ERP service a request "request inventory information". In step 2, a mashup invoker intercepts the request "request order information" and the request "request inventory information", and redirects the requests to the mashup gateway. In step 3, the mashup gateway forwards the received request "request order information" to the CRM service. In step 3', the mashup gateway forwards the received request "request inventory information" to the ERP service. In step 4, the CRM service acquires order information according to the received "request order information" and returns the order information to the client, and the mashup gateway receives and caches the order information. In step 4', the ERP service acquires inventory information according to the received "request inventory information" and returns the inventory information to the client, and the mashup gateway receives and caches the inventory information. In step 5, the mashup gateway returns the order information and the inventory information to the client. In steps 6 and 6', the mashup invoker of the client provides the received order information and inventory information to the browser respectively, which presents them in the CRM widget and the ERP widget in the mashup page respectively so as to be viewed and/or modified by the user. In this example, as shown in FIG. 7, the ERP widget will refer to data items such as order ID, quantity of product units, etc. in the CRM widget. After the user performs an update in the browser, in step 8 and 8' the user sends the updated data to the server by clicking a submit button. In step 9, the mashup invoker will intercept the updated data and redirect it to the mashup gateway.

After the mashup gateway acquires the updated data, it will execute a data consistency check by using data consistency rules and utilizing the order information and inventory information cached in the mashup gateway. The data consistency rules can be generated automatically based on the reference and dependency relationships and/or operation logics in the order information and inventory information cached in the mashup gateway, or can be edited by a user, or be edited by a user after the automatic generation. If there is data inconsistency due to intentional or inadvertent operations of the user or browser script exceptions, the inconsistency will be detected, and an error message will be sent to the client user or the administrator. If the checking does not find any data inconsistency, then in step 10 and 10', the mashup gateway will send the update data to corresponding services. At this time, in step 11, transaction rules can be applied. For example, if the update data sent by the CRM widget (such as a submitted form) is submitted to the CRM service correctly, and the submission of the updated data sent by the ERP widget fails, then the submitted CRM form will be cancelled, and relevant persons will be informed if necessary so that proper actions can be taken.

The foregoing describes the operation process of the apparatus for reliable mashup of the present invention by taking the CRM and ERP services as an example. However, it should be pointed out that the above description is only illustrative instead of a limitation to the present invention. The apparatus for reliable mashup of the present invention can also be used for any other kinds and numbers of services.

The present invention can be implemented by hardware or a combination of hardware and software. The present invention can be implemented in a computer system in a centralized mode or in a distributed mode. In the distributed mode, different parts are distributed in several interconnected computer systems. Any computer system or other apparatus suitable for executing the method described herein is applicable. A typical combination of hardware and software may be a general-purpose computer system having a computer program, which, when being loaded and executed, controls the computer system to enable it to execute the method of present invention, or constitute the apparatus of the present invention.

The present invention can also be embodied in a computer program product which comprises a program for causing a computer to perform the methods described herein.

While the present invention is shown and described with particular reference to the preferred embodiments, a person skilled in the art will understand that the above and various other changes in form and detail can be made thereto without departing from the spirit and scope of the present invention.

What is claimed is:

1. A method reliable computer-implemented mashup of data in communications between a client and at least one service, comprising the steps of:
    intercepting, by an intercepting module, a data update request comprising client modifiable data submitted by a client browser to at least one service of a plurality of services providing mashup page data for a mashup data page before said request arrives at said at least one service, wherein said client browser is in a client computer;
    generating consistency rules by analyzing the mashup page data;
    performing consistency validation on client modifiable data in said request by a consistency validator using consistency rules to produce a validity determination indicating whether client modifiable data was modified at the client; and
    forwarding, by a forwarding module, said request from said consistency validator to said at least one service in response to said validity determination,
    wherein the consistency rules are generated by (i) analyzing the Document Object Model (DOM) tree of the mashup page, and (ii) analyzing mashup logic in the mashup page data.

2. The method according to claim 1, wherein the consistency rules include at least one of the dependency or reference relationships among data items transferred between the client browser and the plurality of services and operation logic on the data items.

3. The method according to claim 1, further comprising the steps of:
    intercepting data provided to the client browser by the plurality of services;
    caching the intercepted data; and
    executing the consistency validation utilizing the cached data.

4. The method according to claim 1, wherein the method is implemented by a gateway disposed between the client browser and the plurality of services.

5. An apparatus for reliable mashup of data in communications between a client and at least one service, comprising:
    a computing device for implementing modules;
    an intercepting module configured to intercept a data update request comprising client modifiable data submitted by a client browser to at least one of a plurality of services providing mashup page data for a mashup page;
    a rule generator configured to generate consistency rules by analyzing the mashup page data;
    a consistency validator module configured to perform consistency validation on client modifiable data in said request using consistency rules to produce a validity determination indicating whether client modifiable data was modified at the client; and
    a forwarding module responsive to said validity determination to forward said request to said at least one service,
    wherein the rule generator generates the consistency rules by (i) analyzing the Document Object Model (DOM) of the mashup page, and (ii) analyzing mashup logics in the mashup page data.

6. The apparatus according to claim 5, wherein the consistency rules include relationships among data items transferred between the client browser and the plurality of services.

7. The apparatus according to claim 5, wherein:
    the intercepting module is further configured to intercept and cache data provided to the client browser by the plurality of services; and
    the consistency validator performs the consistency validation on said request by utilizing the cached data.

8. The apparatus according to claim 5, further comprising:
    a transaction engine configured to implement transaction processing between the client browser and the plurality of services by using transaction rules.

9. The apparatus according to claim 5, further comprising:
    a mashup invoker configured to intercept a request sent by the client browser to the plurality of services, and forward the request to the intercepting module.

10. The apparatus according to claim 5, wherein the apparatus is implemented by using a gateway disposed between the client browser and the plurality of services.

11. A non-transitory computer-readable storage medium tangibly embodying computer-executable program instructions which, when executed, cause a computer to perform a method for reliable mashup of data in communications between a client and at least one service, the method comprising the steps of:
    intercepting, by an intercepting module, a data update request comprising client modifiable data submitted by a client browser to at least one service of a plurality of services providing mashup page data for a mashup page before said request arrives at said at least one service;
    generating consistency rules by analyzing the mashup page data;
    performing consistency validation on client modifiable data in said request by a consistency validator using consistency rules to produce a validity determination indicating whether client modifiable data was modified at the client; and
    forwarding, by a forwarding module, said request from said consistency validator to said at least one service in response to said validity determination,
    wherein the consistency rules are generated by (i) analyzing the Document Object Model (DOM) tree of the mashup page, and (ii) analyzing mashup logic in the mashup page data.

* * * * *